(12) United States Patent
Pan

(10) Patent No.: US 11,564,531 B2
(45) Date of Patent: Jan. 31, 2023

(54) DEVICE FOR AUTOMATICALLY HAND-SWAYING BEVERAGE CUPS

(71) Applicant: O-VIEW Technology Co., Ltd., New Taipei (TW)

(72) Inventor: Chia-l Pan, New Taipei (TW)

(73) Assignee: O-VIEW TECHNOLOGY CO., LTD., New Taipei (TW)

( * ) Notice: Subject to any disclaimer, the term of this patent is extended or adjusted under 35 U.S.C. 154(b) by 433 days.

(21) Appl. No.: 16/815,298

(22) Filed: Mar. 11, 2020

(65) Prior Publication Data

US 2020/0288913 A1    Sep. 17, 2020

(30) Foreign Application Priority Data

Mar. 12, 2019  (TW) ................................. 108108300

(51) Int. Cl.
*A47J 43/042* (2006.01)
*B25J 15/00* (2006.01)
*B25J 11/00* (2006.01)
*B25J 9/16* (2006.01)

(52) U.S. Cl.
CPC .......... *A47J 43/042* (2013.01); *B25J 9/1612* (2013.01); *B25J 11/0045* (2013.01); *B25J 15/0033* (2013.01)

(58) Field of Classification Search
CPC .. B25J 15/033; B25J 15/0038; B25J 15/0253; B25J 15/106; B25J 9/1612; B25J 11/0045; A47J 43/042
See application file for complete search history.

(56) References Cited

U.S. PATENT DOCUMENTS

| 5,466,025 A | * | 11/1995 | Mee | B64G 4/00 244/172.4 |
| 7,577,498 B2 | * | 8/2009 | Jennings | B25J 9/0087 435/286.2 |
| 9,004,560 B2 | * | 4/2015 | Umeno | B25J 15/0038 901/31 |
| 9,022,442 B2 | * | 5/2015 | Rousseau | B25J 15/0028 294/90 |
| 2018/0330566 A1 | * | 11/2018 | Sakhno | A23L 2/04 |

* cited by examiner

*Primary Examiner* — Dean J Kramer
(74) *Attorney, Agent, or Firm* — Muncy, Geissler, Olds & Lowe, P.C.

(57) ABSTRACT

A device for automatically hand-swaying beverage cups is disclosed, comprising a robotic arm and a cover, wherein the robotic arm has a plurality of movable arms and a plurality of joints that pivotally connect each of the movable arms to each other, and at the extreme end of such movable arms there install a pair of symmetrical clamping components and a clamping controller, and also includes a host computer electrically connected to each of the movable arms, each of the joints and the clamping controller, respectively; in addition, the cover respectively has a conical surface on the outside, an inner hole is openly configured on the bottom surface of the cover, and each of the clamping components can collectively clamp the cover and the cup thus facilitating the hand-swaying operations of the cup with the robotic arm.

6 Claims, 8 Drawing Sheets

DEVICE FOR AUTOMATICALLY HAND-SWAYING BEVERAGE CUPS

BACKGROUND OF THE INVENTION

1. Field of the Invention

The present invention relates to a device for automatically hand-swaying beverage cups, and the method and the device thereof enable an automatic hand-swaying function applicable for beverage cups by means of auxiliary automatic machines.

2. Description of Related Art

It is well-known that tea drinking has a long history in Asian countries, so that tea products are indispensable drinking commodities for Asian people's daily lives. Due to the evolution of the times and technological advancement, fast-paced and busy lives make most people not have enough time to make tea leisurely, so fast and convenient hand-swaying tea shops gradually appear everywhere to replace the conventional approach.

It should be appreciated that such hand-swaying tea shops have the advantages in terms of efficiency, convenience and selectiveness, the market demand thereof is large and the need for manpower is relatively elevated, but most of their tea products are typically characterized in low prices. Therefore, with respect to operating costs, the hiring of manpower has always been a laborious evaluation issue for hand-swaying tea shops, and manual hand-swaying operations may also adversely result in insufficient quality stability.

Consequently, the idea is that a robotic arm may be introduced as an auxiliary apparatus to automatically hand-sway beverage cups, thereby effectively replacing manpower and reducing operating costs, such that the device for automatically hand-swaying beverage cups according to the present invention can be applied as the solution for the aforementioned issues.

SUMMARY OF THE INVENTION

A method for automatically hand-swaying beverage cups according to the present invention, comprising the following steps: SEALING FILM—the beverage is prepared in a cup which is then sent to a sealing film machine for film sealing operation; PUTTING ON COVER—a cover having a conical surface on the top is placed in fit onto the sealed film of the cup; FIXEDLY CLAMPING—a robotic arm is applied to operate clamping components in order to respectively clamp on the conical surface of the cover and lower cup edge of the cup such that the cover and the cup are clamped together; AUTOMATIC HAND-SWAY—the robotic arm performs swing or rotate operations on the collectively clamped cover and cup in order to evenly mix the beverage prepared in the cup.

More specifically, the swing or rotate actions of the robotic arm are set to simulate human's hand-sway motions.

A device for automatically hand-swaying beverage cups according to the present invention, comprising a robotic arm and a cover, wherein the robotic arm has a plurality of movable arms and a plurality of joints that pivotally connect each of the movable arms to each other, and at the extreme end of such movable arms there install a pair of symmetrical clamping components and a clamping controller, in which the clamping controller is used to control each of the clamping components to perform clamping and loosening actions, and each of the clamping components has a first clamping part and a second clamping part formed there above and there below, respectively, and also has a host computer electrically connected to each of the movable arms, each of the joints and the clamping controller, respectively; in addition, the cover respectively has a conical surface on the outside, and an inner hole is openly configured on the bottom surface of the cover, and an explosion-proof hole is further openly configured on the bottom surface of the inner hole; thereby that the inner hole is used to cover the cup edge of a cup and a sealing film is sealed to the cup edge, and each of the clamping components can collectively clamp the cover and the cup, with the first clamping part clamping on the conical surface and the second clamping part clamping on the inner side below the cup edge, so as to facilitate the hand-swaying operation of the cup through the robotic arm, and upon performing the hand-swaying operation to the cup, the bottom surface of the inner hole can press the cup edge and the sealing film, and the explosion-proof hole allows a space for pressure relief, thus avoiding that the cup may break and burst due to excessive pressure occurring at the connection position between the cup edge and sealing film during the hand-swaying operation.

More specifically, the conical surface is configured to have a narrowed top and a widened bottom.

More specifically, the outside of the cover includes a ring groove, and the ring groove is located below the conical surface.

More specifically, the first clamping part and the second clamping part are individually configured as two independent components.

More specifically, the first clamping part and the second clamping part are integrally formed as one component.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

The method for automatically hand-swaying beverage cups according to the present invention comprises the following steps:

SEALING FILM—the beverage is prepared in a cup which is then sent to a sealing film machine for film sealing operation;

PUTTING ON COVER—a cover having a conical surface on the top is placed in fit onto the sealed film of the cup;

FIXEDLY CLAMPING—a robotic arm is applied to operate clamping components in order to respectively clamp on the conical surface of the cover and lower cup edge of the cup such that the cover and the cup are clamped together; and AUTOMATIC HAND-SWAY—the robotic arm performs swing or rotate operations on the collectively clamped cover and cup in order to evenly mix the beverage prepared in the cup, and such swing or rotate actions of the robotic arm can be configured to simulate human's hand-sway motions by means of control settings.

Figure 1:
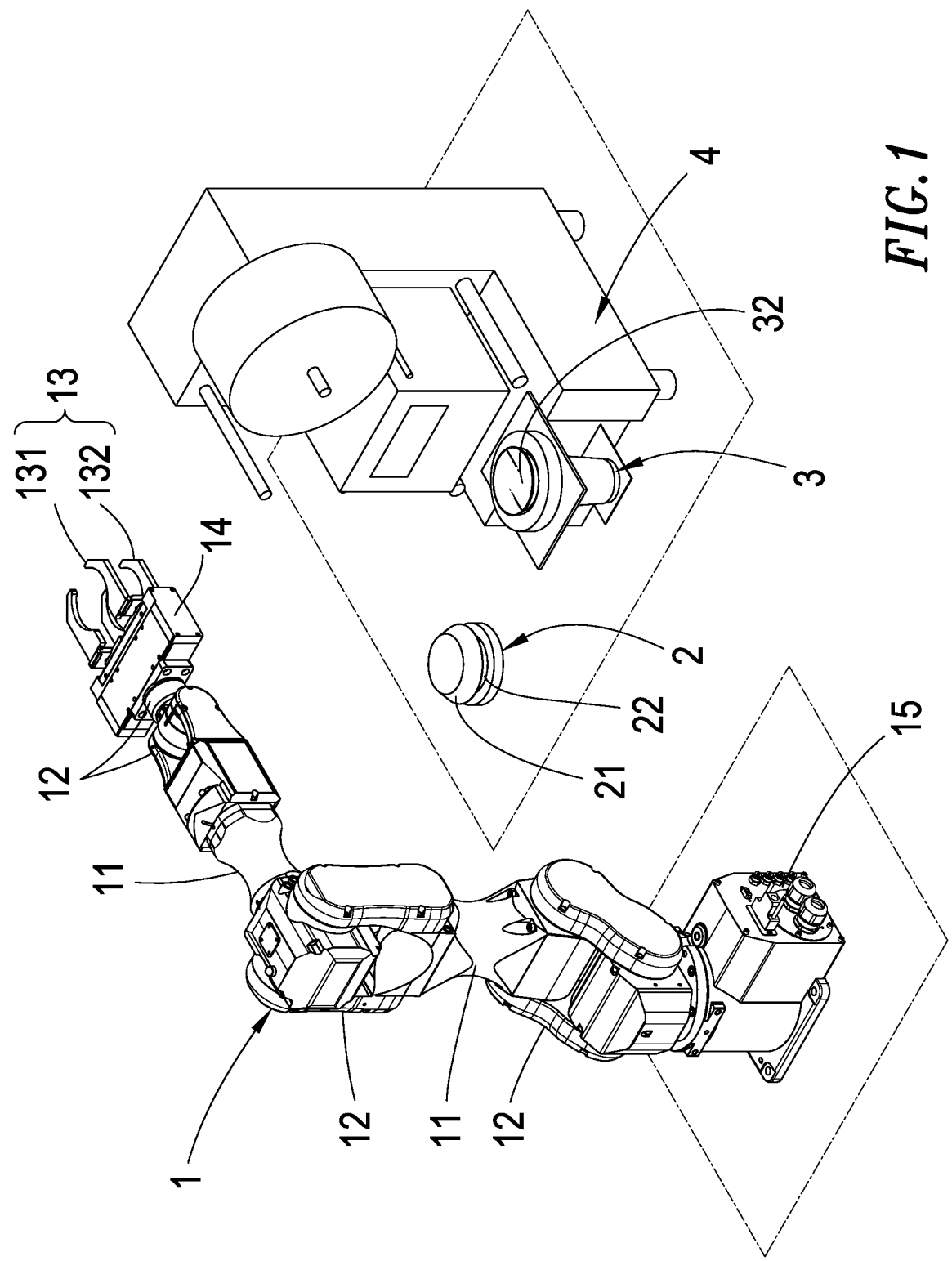
FIG. 1 shows an overall structural stereo view of the device for automatically hand-swaying beverage cups according to the present invention.
Figure 2:
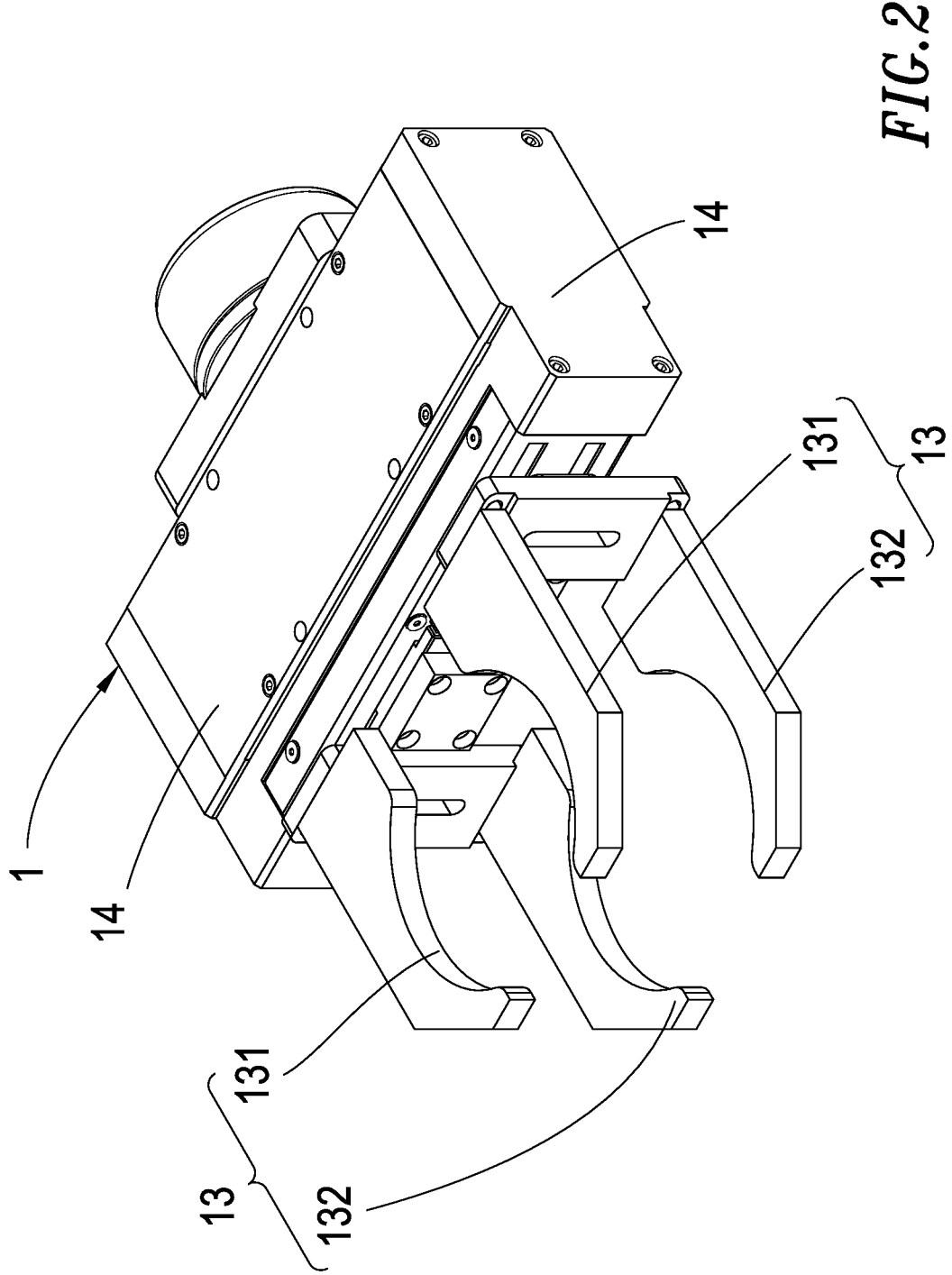
FIG. 2 shows a partial stereo view of a clamping component in the device for automatically hand-swaying beverage cups according to the present invention.

Refer then to FIGS. 1-2, wherein an overall structural stereo view and a partial stereo view of the device for automatically hand-swaying beverage cups according to the present invention are respectively shown, comprising at least one robotic arm 1 and a cover 2.

Herein the robotic arm 1 has a plurality of movable arms 11 and a plurality of joints 12 that pivotally connect each of the movable arms 11 to each other, and at the extreme end of such movable arms 11 there install a pair of symmetrical clamping components 13 and a clamping controller 14, in which the clamping controller 14 is used to control each of the clamping components 13 to perform clamping and loosening actions, and each of the clamping components 13 has a first clamping part 131 and a second clamping part 132 formed there above and there below, respectively, and also has a host computer 15 electrically connected to each of the movable arms 11, each of the joints 12 and the clamping controller 14, respectively, in order to control the directions and angles of each of the movable arms 11 and each of the joints 12 as well as to drive the clamping controller 14.

In addition, the outside of the cover 2 respectively includes a conical surface 21 featuring a narrower top side and a wider bottom side and a ring groove 22, and the conical surface 21 is located above the ring groove 22; also, an inner hole 23 is openly configured on the bottom surface of the cover 2, and an explosion-proof hole 24 is further openly configured on the bottom surface of the inner hole 23.

In this way, the inner hole 23 can be used to cover the cup edge 31 of a cup 3 and a sealing film 32 is sealed to the cup edge 31, and each of the clamping components 13 can collectively clamp the cover 2 and the cup 3, with the first clamping part 131 clamping on the conical surface 21 and the second clamping part 132 clamping on the inner side below the cup edge 31, so as to facilitate the hand-swaying operation of the cup 3 through the robotic arm 1, and upon performing the hand-swaying operation to the cup 3, the bottom surface of the inner hole 23 can press the cup edge 31 and the sealing film 32, and the explosion-proof hole 24 allows a space for pressure relief, thus avoiding that the cup 3 may break and burst due to excessive pressure occurring at the connection position between the cup edge 31 and sealing film 32 during the hand-swaying operation.

Figure 3:
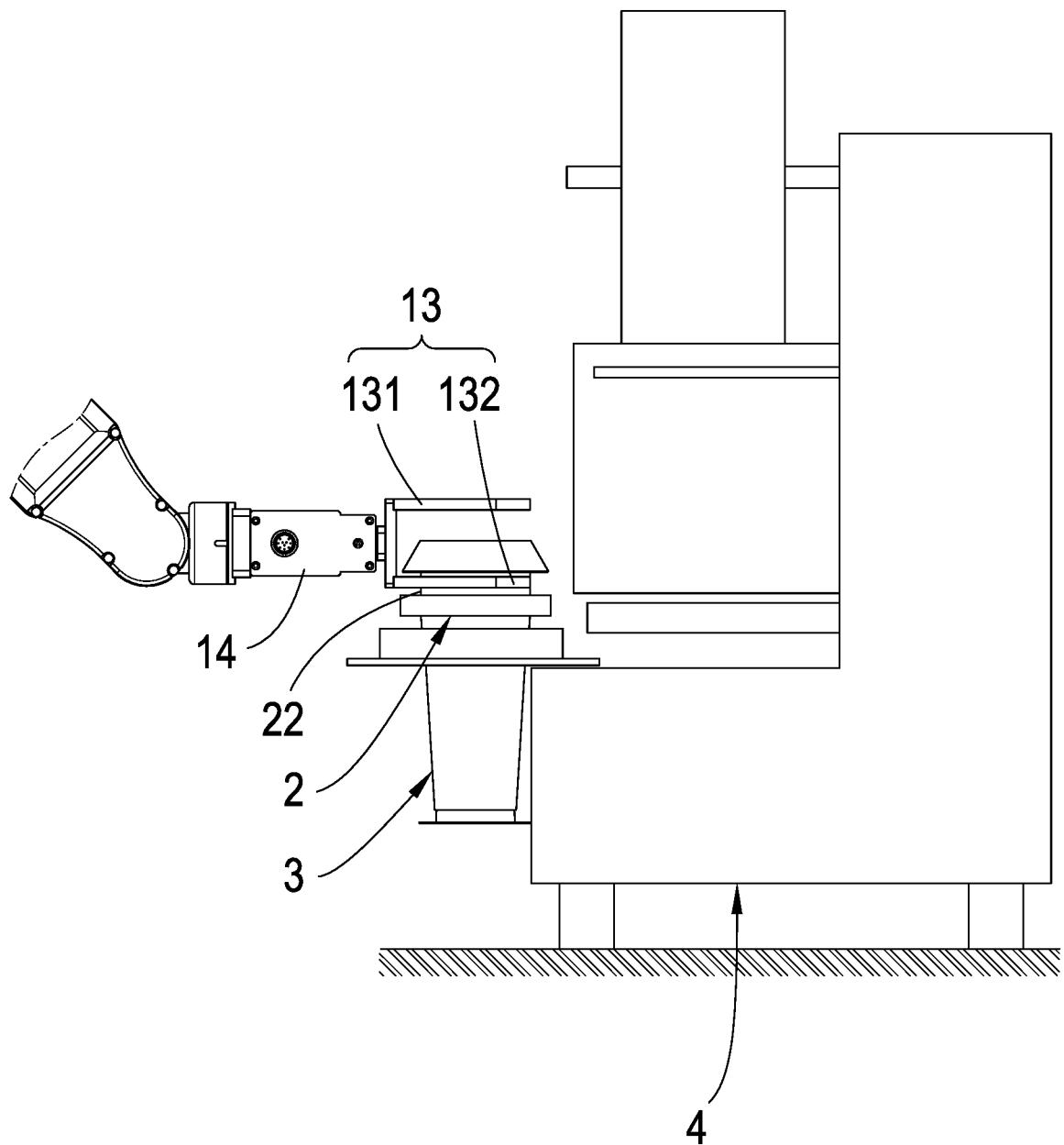
FIG. 3 shows a planar view regarding to the implementation of the PUTTING ON COVER step by means of the device for automatically hand-swaying beverage cups according to the present invention.
Figure 4:
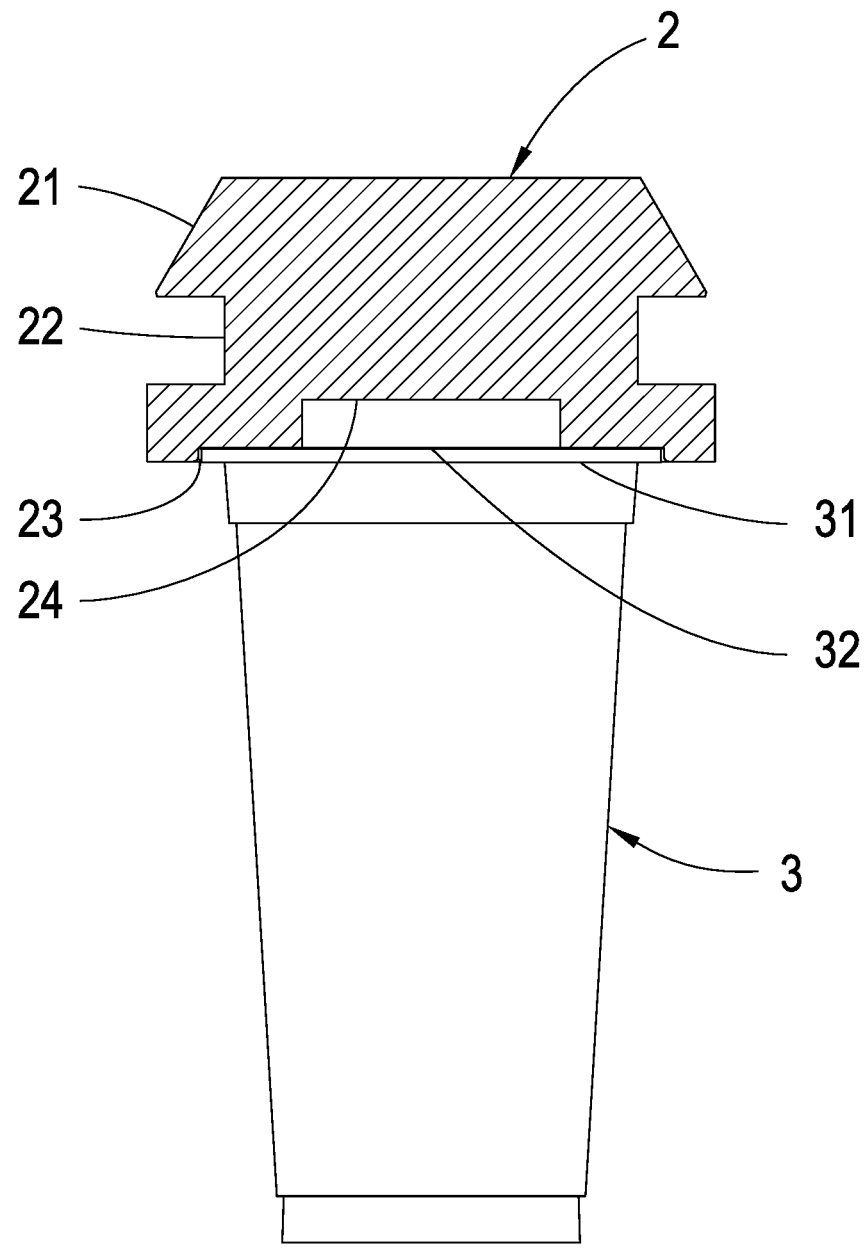
FIG. 4 shows a cross-sectioned view regarding to putting the cover on a cup by means of the device for automatically hand-swaying beverage cups according to the present invention.
Figure 5:
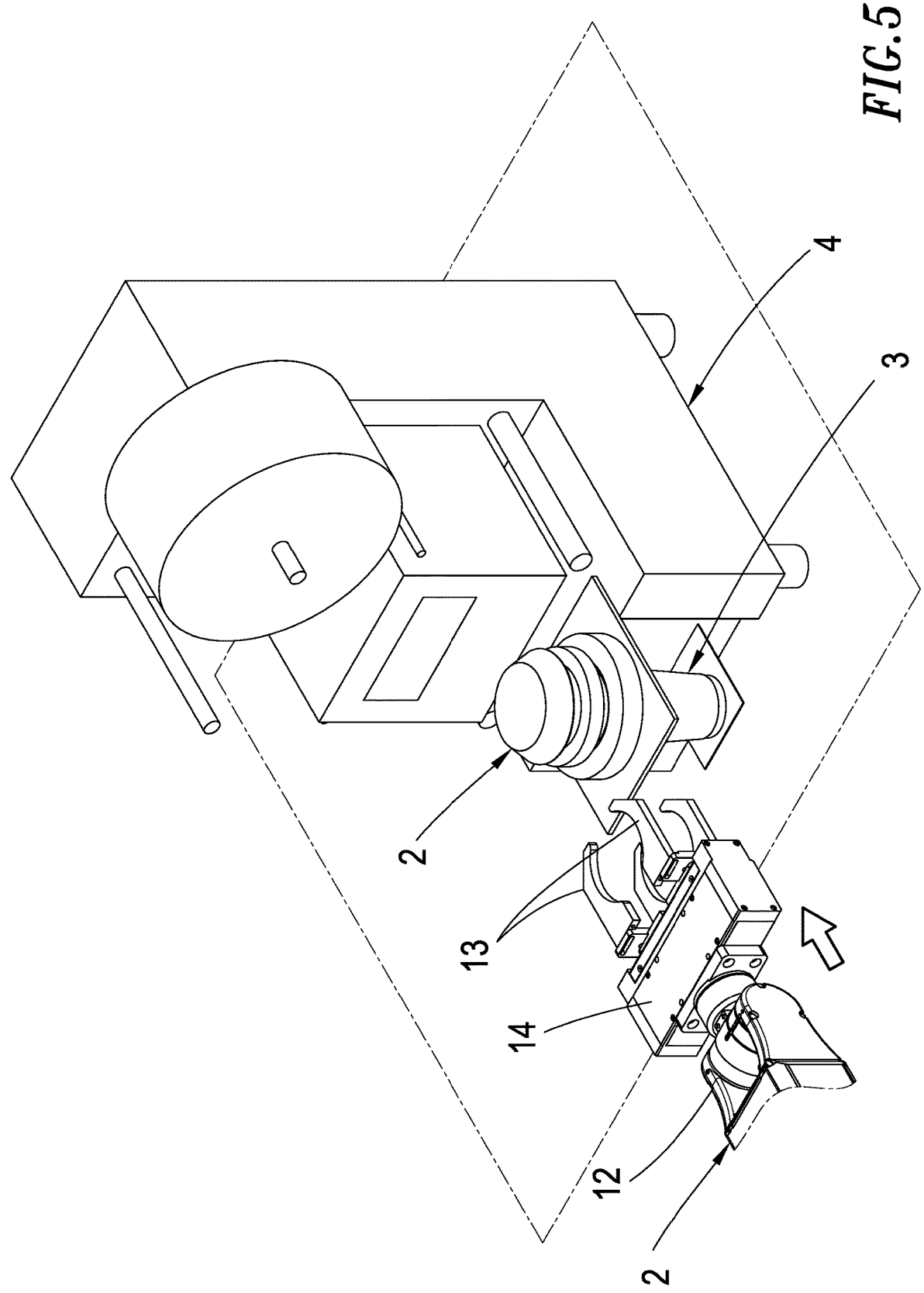
FIG. 5 shows a stereo view regarding to the implementation of the FIXEDLY CLAMPING step by means of the device for automatically hand-swaying beverage cups according to the present invention.
Figure 6:
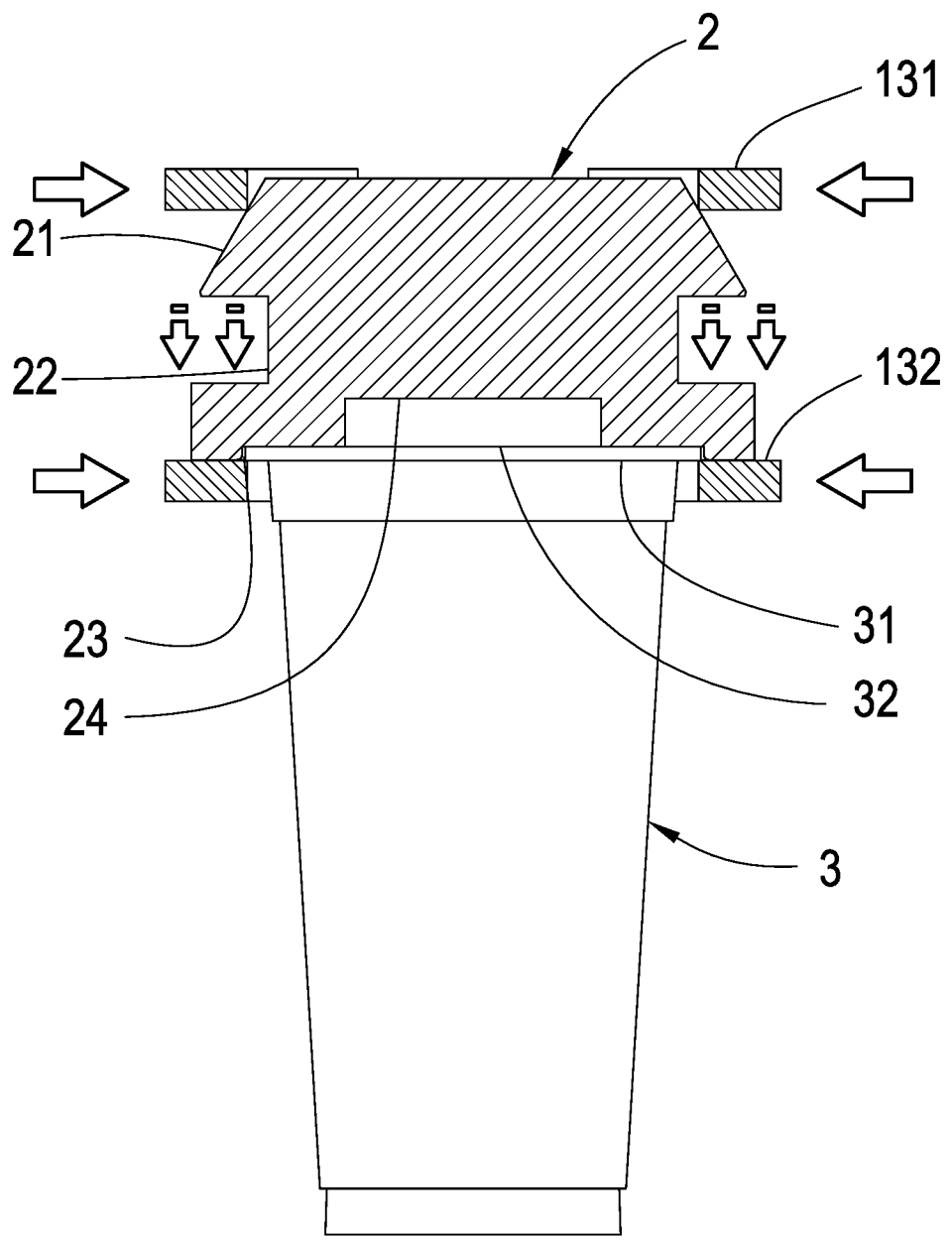
FIG. 6 shows a cross-sectioned view regarding to the implementation of the FIXEDLY CLAMPING step by means of the device for automatically hand-swaying beverage cups according to the present invention.
Figure 7:
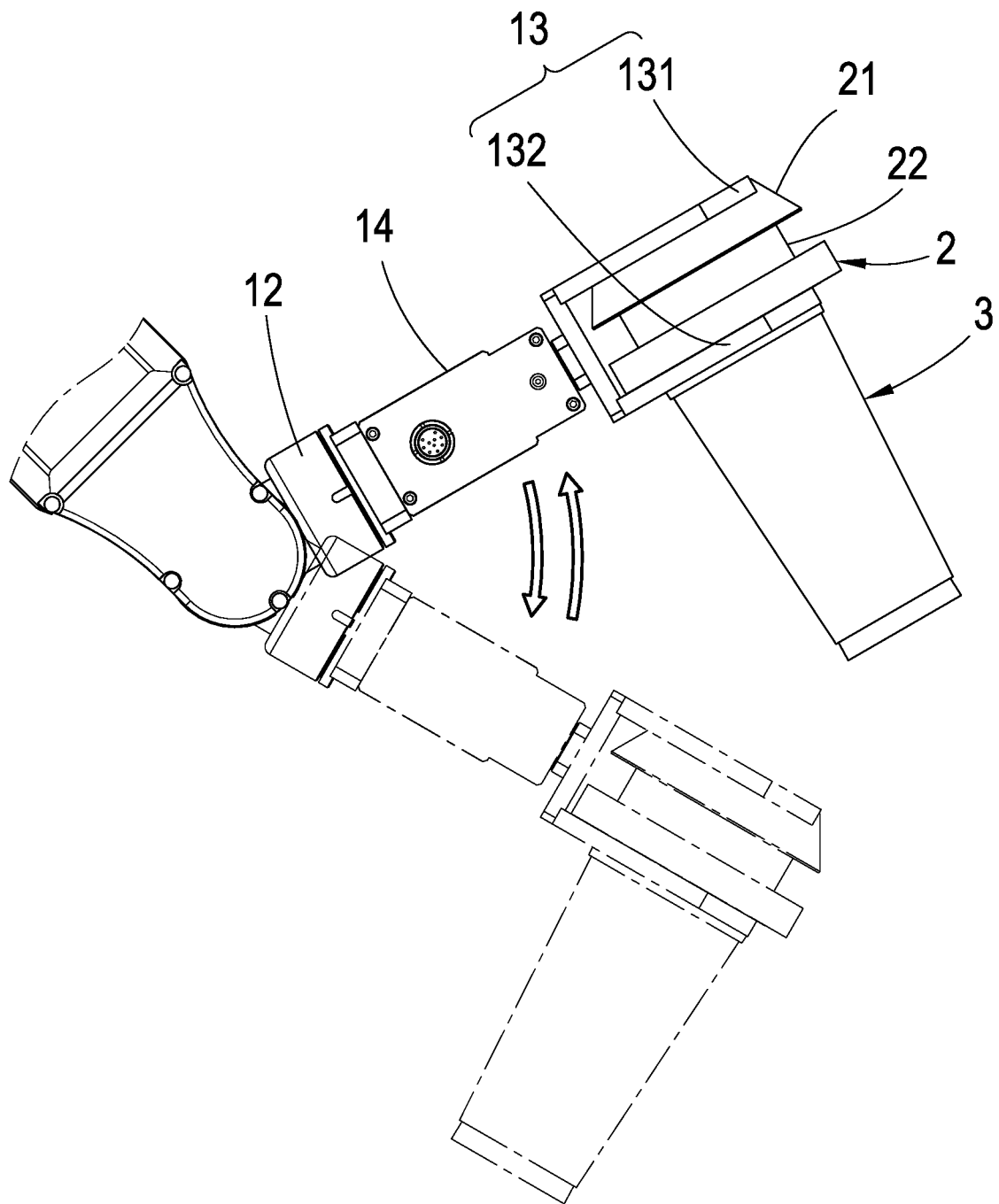
FIG. 7 shows a planar view regarding to the implementation of the AUTOMATIC HAND-SWAY step by means of the device for automatically hand-swaying beverage cups according to the present invention.

The device for automatically hand-swaying beverage cups according to the present invention is suitable to provide the function of automatic beverage cup anthropomorphic hand-swaying movement, whose actions will be further explained in details hereunder. Refer to FIG. 1. Initially, after the beverage is prepared in a cup 3, the cup can be placed to a sealing film machine 4 by means of the robotic arm 1 or manual operations in order to perform the film sealing process. Refer next to FIGS. 3-4, then the cover 2 can be put in fit onto the sealing film of the cup 3 through the robotic arm 1 or manually, and let the cup edge 31 be placed in the inner hole 23. In the present embodiment, the robotic arm 1 is used to make each of the clamping components 13 clamp the ring groove 22 so as to clamp the cover 2. Following this, refer to FIGS. 5-6, wherein the robotic arm 1 operates the first clamping part 131 and the second clamping part 132 of each clamping component 13 respectively in order to clamp toward the inside on the conical surface 21 and below the cup edge 31, such that each of the clamping components 13 clamps collectively the cover 2 and the cup 3 in fixation. Refer then to FIG. 7, in which each of the clamping components 13 can be driven by the robotic arm 1 so as to perform the swing or rotate movements thereby achieving the AUTOMATIC HAND-SWAY function.

Figure 8:
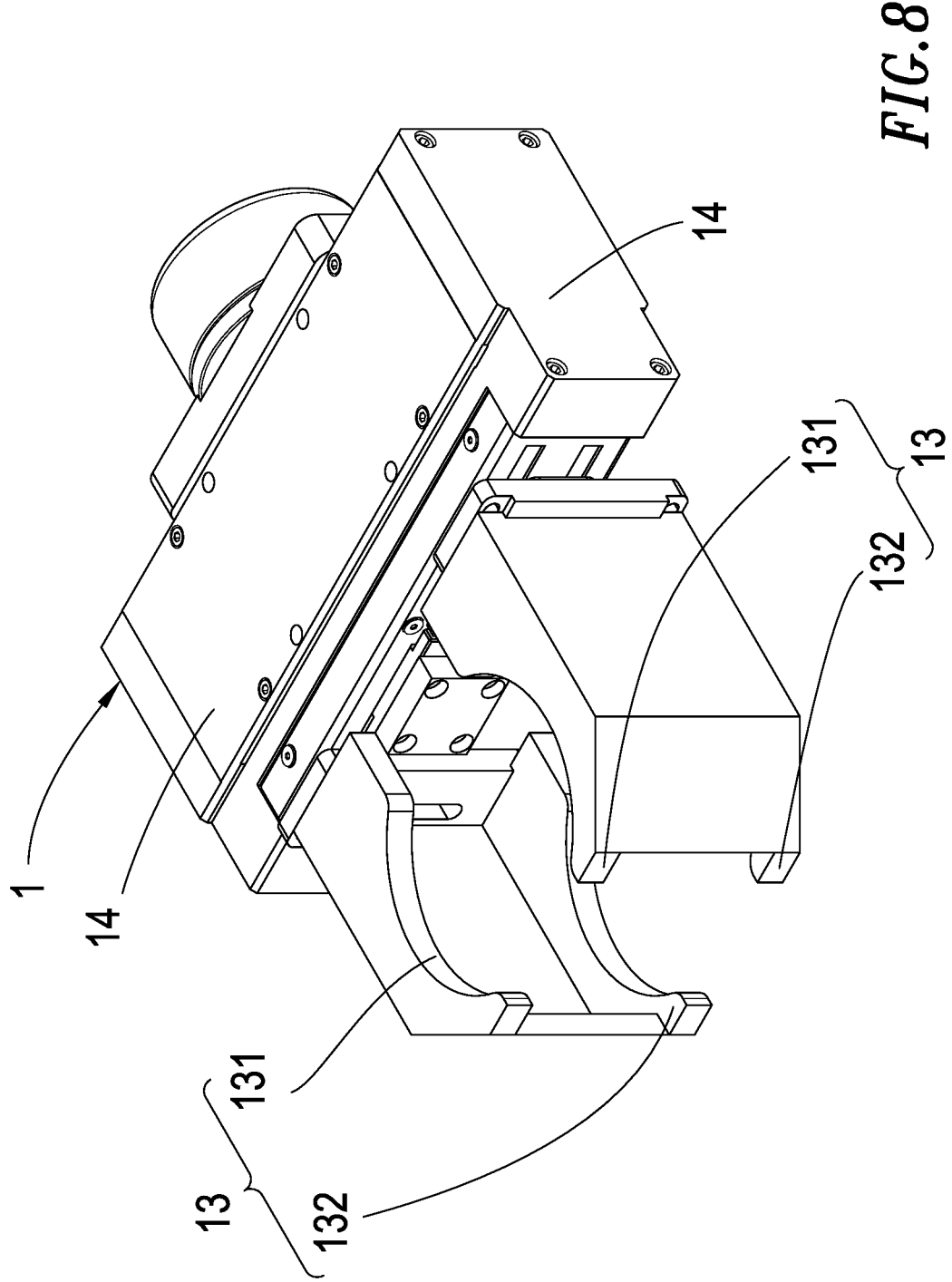
FIG. 8 shows a partial stereo view of another clamping component in the device for automatically hand-swaying beverage cups according to the present invention.

Subsequently, referring to FIG. 2, it can be observed that the first clamping part 131 and the second clamping part 132 of the clamping component 13 can be individually configured as two independent components; or alternatively, by referring to FIG. 8, the first clamping part 131 and the second clamping part 132 of the clamping component 13 may be also integrally designed and formed as one component.

In comparison with other conventional technologies, the device for automatically hand-swaying beverage cups according to the present invention provides the following advantages:

1. The cover is put and covered in fit previously before performing the automatic hand-swaying operation, and the recessed hole located at the bottom of the cover can be completely covered on the edge of the cup, so the fixation in conjunction with the clamping components allow to prevent leakage issues occurring due to incompletely tight joint along the cup edge during the hand-swaying operation performed by the robotic arm, thus improving the quality of the overall operation.

2. The conical surface design of the cover can effectively assist the clamping components to avoid the cover more smoothly, thereby facilitating movement to the two sides of the cover and the cup in order to perform the clamping and fixing actions; besides, more importantly, when each of the clamping components performs inwardly the clamping action, the conical surface featuring a narrower top side and a wider bottom side can help the cover closely adhere to the cup edge downward, so that the cover and the cup can be tightly jointed.

3. The recessed hole design of the cover, in addition to completely covering the cup edge to avoid leakage problems, can also prevent the robotic arm from touching or rubbing during the process of moving to the two sides of the cover and the cup, which may undesirably lead to the displacement of the cover.

The previously disclosed embodiments are merely illustrative of some preferred ones of the present invention, which are not intended to limit the scope thereof; those who are skilled in the relevant technical fields can, after understanding the technical features and embodiments of the present invention as explained hereinabove, certainly make equivalent changes, alterations or modifications without departing from the spirit and scope of the present invention, which are nonetheless deemed as falling within the coverage of the present invention; accordingly, the scope of the present invention to be protected by patent laws is subject to the definition of the claims attached to this specification.

What is claimed is:

1. A device for automatically hand-swaying beverage cups, comprising:
   a robotic arm, having a plurality of movable arms and a plurality of joints that pivotally connect each of the movable arms to each other, and at the extreme end of such movable arms a pair of symmetrical clamping components and a clamping controller are installed, in which the clamping controller is used to control each of the clamping components to perform clamping and loosening actions, and each of the clamping components has a first clamping part and a second clamping part, and also has a host computer electrically connected to each of the movable arms, each of the joints and the clamping controller, respectively;
   a cover, having a conical surface on a top of the cover, inner hole on the bottom surface of the cover, and an explosion-proof hole on the bottom surface of the inner hole;
   thereby that the inner hole is used to cover the cup edge of a cup and a sealing film is sealed to the cup edge, and each of the clamping components can collectively clamp the cover and the cup, with the first clamping part clamping on the conical surface and the second clamping part clamping on a lower surface of the cup edge, so as to facilitate the hand-swaying operation of the cup through the robotic arm, and upon performing the hand-swaying operation to the cup, the bottom surface of the inner hole can press the cup edge and the sealing film, and the explosion-proof hole allows a space for pressure relief, thus avoiding that the cup may break and burst due to excessive pressure occurring at a connection position between the cup edge and sealing film during the hand-swaying operation.

2. The device for automatically hand-swaying beverage cups according to claim 1, wherein the conical surface includes a narrowed top and a widened bottom.

3. The device for automatically hand-swaying beverage cups according to claim 1, wherein the top of the cover includes a ring groove.

4. The device for automatically hand-swaying beverage cups according to claim 3, wherein the ring groove is located below the conical surface.

5. The device for automatically hand-swaying beverage cups according to claim 1, wherein the first clamping part and the second clamping part are two independent components.

6. The device for automatically hand-swaying beverage cups according to claim 1, wherein the first clamping part and the second clamping part are integrally formed as one component.

* * * * *